US011638942B2

(12) United States Patent
Alken et al.

(10) Patent No.: US 11,638,942 B2
(45) Date of Patent: May 2, 2023

(54) METALLURGICAL DEVICE WITH SELF-POWERED SENSING

(71) Applicant: SMS GROUP GMBH, Düsseldorf (DE)

(72) Inventors: Johannes Alken, Siegen (DE); Torsten Müller, Kreuztal (DE); Peter Sudau, Hilchenbach (DE)

(73) Assignee: SMS GROUP GMBH, Düsseldorf (DE)

( * ) Notice: Subject to any disclaimer, the term of this patent is extended or adjusted under 35 U.S.C. 154(b) by 409 days.

(21) Appl. No.: 16/609,292

(22) PCT Filed: Mar. 27, 2018

(86) PCT No.: PCT/EP2018/057783
§ 371 (c)(1),
(2) Date: Oct. 29, 2019

(87) PCT Pub. No.: WO2018/210473
PCT Pub. Date: Nov. 22, 2018

(65) Prior Publication Data
US 2020/0204039 A1  Jun. 25, 2020

(30) Foreign Application Priority Data

May 15, 2017  (DE) ............... 10 2017 208 119.8

(51) Int. Cl.
*B21B 38/00* (2006.01)
*B21B 99/00* (2006.01)
(Continued)

(52) U.S. Cl.
CPC .............. *B21B 38/00* (2013.01); *B21B 99/00* (2013.01); *H02K 1/2713* (2013.01);
(Continued)

(58) Field of Classification Search
CPC ...... B21B 38/00; B21B 99/00; H02K 1/2713; H02K 7/1807; H02K 11/20; H02K 11/30; H02K 1/2786; H02K 16/005
See application file for complete search history.

(56) References Cited

U.S. PATENT DOCUMENTS 3,828,600 A  8/1974  Borisenko
7,241,053 B2  7/2007  Sato
(Continued)

FOREIGN PATENT DOCUMENTS

CN  103302112 B  9/2015
DE  19910197 C1  10/2000
(Continued)

OTHER PUBLICATIONS

CN103302112_Englishtranslation (Year: 2022).*
DE102007035453A1_Engishtranslation (Year: 2022).*

*Primary Examiner* — Tulsidas C Patel
*Assistant Examiner* — Viswanathan Subramanian
(74) *Attorney, Agent, or Firm* — Lucas & Mercanti, LLP; Klaus P. Stoffel

(57) ABSTRACT

A metallurgical device, in particular a casting installation, rolling mill or strip processing installation, including at least one machine part rotating about an axis, wherein an energy consumer that is in electrical connection with an energy source is arranged in the machine part. To supply the energy consumer with energy on a sustained basis in spite of adverse ambient conditions, the energy source is designed as a generator which is in connection with the rotating machine part for rotation therewith, wherein the generator is otherwise free of any mechanical connection with the metallurgical device and wherein the generator has a housing element, on which at least one eccentric mass arranged at a location that is at a distance radially from the axis.

9 Claims, 2 Drawing Sheets

(51) Int. Cl.
   *H02K 1/2713*    (2022.01)
   *H02K 7/18*      (2006.01)
   H02K 11/20      (2016.01)
   H02K 11/30      (2016.01)

(52) U.S. Cl.
   CPC ........... *H02K 7/1807* (2013.01); *H02K 11/20* (2016.01); *H02K 11/30* (2016.01)

(56) References Cited

U.S. PATENT DOCUMENTS

2010/0033166 A1 * 2/2010 Helle .................. F03D 9/25
                                                    324/205
2016/0261168 A1   9/2016 Harrison

FOREIGN PATENT DOCUMENTS

| DE | 19944652 A1 | 5/2002 |
|----|---|---|
| DE | 60225514 T1 | 6/2008 |
| DE | 102007035453 A1 | 7/2008 |
| EP | 1292831 B1 | 10/2009 |
| EP | 2952870 A1 | 12/2015 |
| KR | 101209006 B1 | 12/2012 |
| RU | 1819166 C | 5/1993 |

* cited by examiner

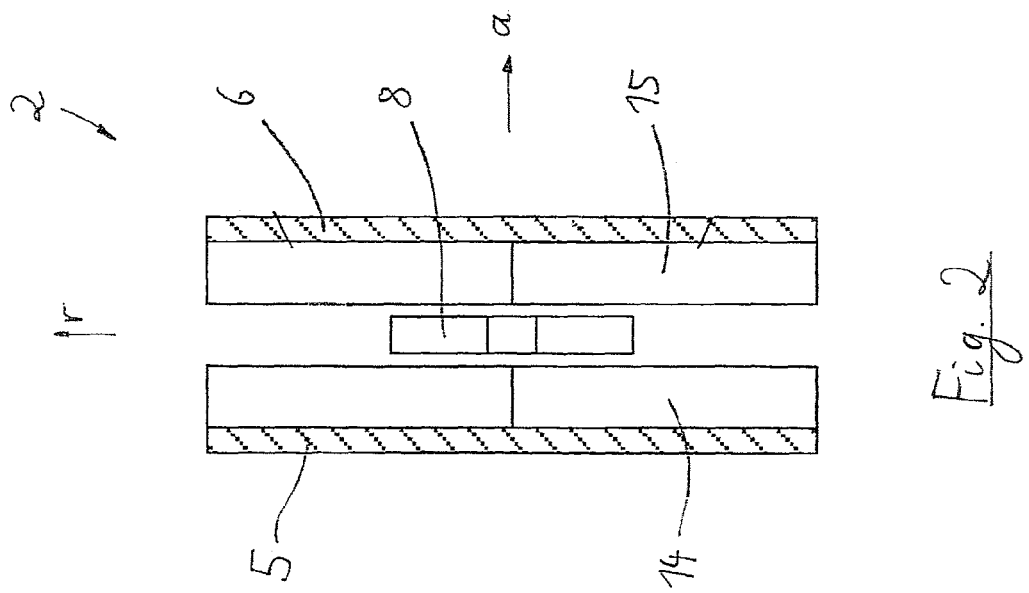
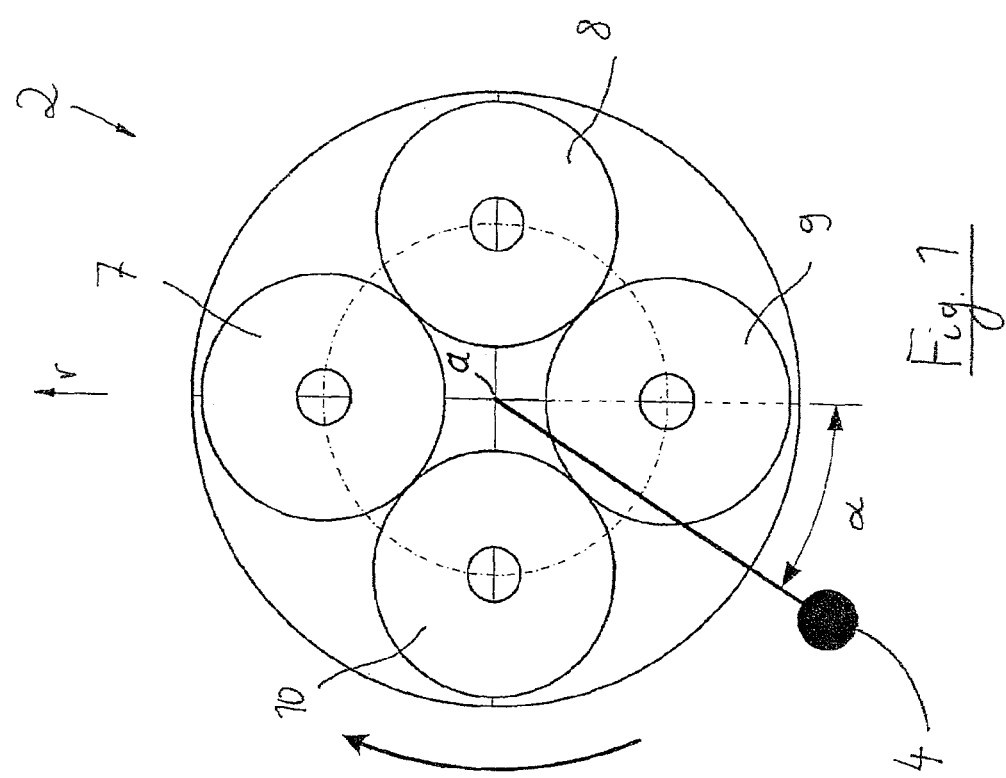

METALLURGICAL DEVICE WITH SELF-POWERED SENSING

CROSS-REFERENCE TO RELATED APPLICATIONS

The present application is a 371 of International application PCT/EP2018/057783, filed Mar. 27, 2018, which claims priority of DE 10 2017 208 119.8 filed May 15, 2017, the priority of these applications is hereby claimed and these applications are incorporated herein by reference.

BACKGROUND OF THE INVENTION

The invention relates to a metallurgical device, in particular a casting installation, a rolling mill or a strip processing installation, comprising at least one machine part rotating about an axis, wherein an energy consumer that is in electrical connection with an energy source is arranged on or in the machine part.

In the case of modern metallurgical installations, such as for example in the case of a casting installation, a rolling mill or strip processing installation, there is increasingly the demand to fit out parts of the installation with sensor equipment for sensing operating parameters. The sensors that are usually used in such cases require for this a supply of energy, which is usually made available from the power grid or from a battery or a storage battery. If operating parameters of rotating components are to be sensed, usually either reliance has to be placed on battery operation or storage-battery operation, or else energy has to be introduced into the rotating system by various auxiliary technical means, for example by way of sliding contacts or in an inductive manner.

Examples of fitting out systems, often roller bearings, with sensor equipment are disclosed by DE 199 44 652 A1, EP 2 952 870 A1, DE 602 25 514 T1 and EP 1 292 831 B1.

WO 2009/080178 A2 shows a system for a printing press in which a generator is used for supplying energy by using movements of a part of the installation and transforming them into electrical energy by energy conversion.

Other similar solutions are shown by DE 199 10 197 C1, CN 103302112 B and KR 101209006 B1.

Disadvantages of the previously known energy transmission systems are firstly difficult conditions due to the adverse, polluted environment in the area of the metallurgical installation. Accordingly, the costs that have to be expended in order for the equipment that is used to withstand the ambient conditions are relatively high. However, the said conditions also disadvantageously lead to a greater susceptibility to faults of the elements that are used.

Furthermore, the maintenance expenditure is correspondingly high, which results in high costs.

Another disadvantage is that the rotating system has to be switched off for maintenance. This leads to high operating costs. The assembly and disassembly of the elements for energy transmission cannot be performed while the components are rotating.

In the case of battery operation, there is the disadvantage that the batteries have to be regularly exchanged. If storage batteries are used, they have to be regularly charged. Another disadvantage in this connection is that the rotating component has to be taken out of operation for this. This leads to increased operating costs. Another disadvantage is that batteries can only be fitted in such a way that they are externally accessible, since they otherwise cannot be changed. The adverse, polluted environment in the area of the metallurgical installation makes it burdensome.

SUMMARY OF THE INVENTION

The invention therefore addresses the problem of configuring a metallurgical device, in particular a casting installation, a rolling mill or strip processing installation, of the type mentioned at the beginning in such a way that the energy consumer can be supplied with energy on a sustained basis in spite of adverse ambient conditions and at the same time the aforementioned disadvantages can be avoided.

The solution solving this problem by the invention is characterized in that the energy source is designed as a generator, which is in connection with the rotating machine part for rotation therewith, wherein the generator is otherwise free of any mechanical connection with the metallurgical device and wherein the generator has a housing element, on which at least one eccentric mass is arranged at a location that is at a distance radially from the axis.

The machine part may in this case be a roller for conveying cast or rolled stock.

The energy consumer may comprise a sensor. It may also comprise a transmitting unit for transmitting a signal.

The generator may comprise an electronic open-loop/closed-loop control for the open-loop/closed-loop control of the energy delivered.

The generator may additionally include an energy store, for example in the form of a storage battery or a capacitor.

The generator may be an axial-flow generator or a radial-flow generator.

A preferred configuration of the invention provides that the generator has two metal plates arranged parallel to one another and spaced apart axially from one another, wherein a number of coil rings arranged on a carrier element are arranged between the metal plates. It may also be provided here that the metal plates are a component part of the housing element, wherein the metal plates are mounted rotatably in relation to the rotating machine part by means of bearings and wherein the carrier element is connected to the rotating machine part for rotation therewith. It is also preferably provided here that at least one metal plate, preferably both metal plates, is/are connected to a multi-pole magnetic plate, which is arranged between the metal plate and the carrier element.

The proposed concept is accordingly based on energy preferably being generated within a rotating component of the metallurgical installation, for which purpose a generator is installed in the component. The generator uses the rotational movement of the rotating component in order to provide the energy required. An axial-flow or a radial-flow generator is preferably used as the generator, but any other type of generator is also conceivable.

Since there is no connection of the housing of the generator with the external, stationary reference system, accordingly no torque support from outside can take place. Therefore, according to the invention, the housing is fixedly connected to the rotating machine part. The metal plates rotatably mounted in the housing, with the multi-pole magnetic plates, are provided with an eccentric mass, which can rotate in relation to the housing under the effect of gravitational force.

The coil windings with the associated connections for an energy management system rotate with the rotating component, that is to say remain fixed in place with respect to it. The electrical design of the generator—that is to say with regard to its number of coils, number of windings, number of permanent magnets, etc. —and the mechanical design—that is to say with regard to the mass of the eccentrically arranged weight, the diameter of the generator, etc.—allow the generator to be optimized with regard to the power output produced for any rotational speed ranges.

Preferably integrated directly on the generator is an energy management system, which immediately provides the controlled supply voltage for example for an integrated sensor.

The advantage of the system fitted out in such a way, with the integrated generator, is firstly that there is no risk of disturbance by external influences (swelling, moisture, mechanical loading), since the generator, as preferably provided, is fitted within the rotating component.

The generator always generates enough energy when it is required, that is to say when the component is rotating.

Separate charging of storage batteries or changing of batteries is no longer required.

The proposed system may already be integrated during first-time assembly, so that then there are no longer any subsequent costs.

BRIEF DESCRIPTION OF THE DRAWING

An exemplary embodiment of the invention is represented in the drawing, in which:

FIG. 1 schematically shows in frontal view a generator that is in rotational connection with a rotating machine part (not represented here) of a metallurgical device, seen in the direction of the axis of the rotating machine part, FIG. 2 shows the side view associated with FIG. 1

DETAILED DESCRIPTION OF THE INVENTION

Figure 3:
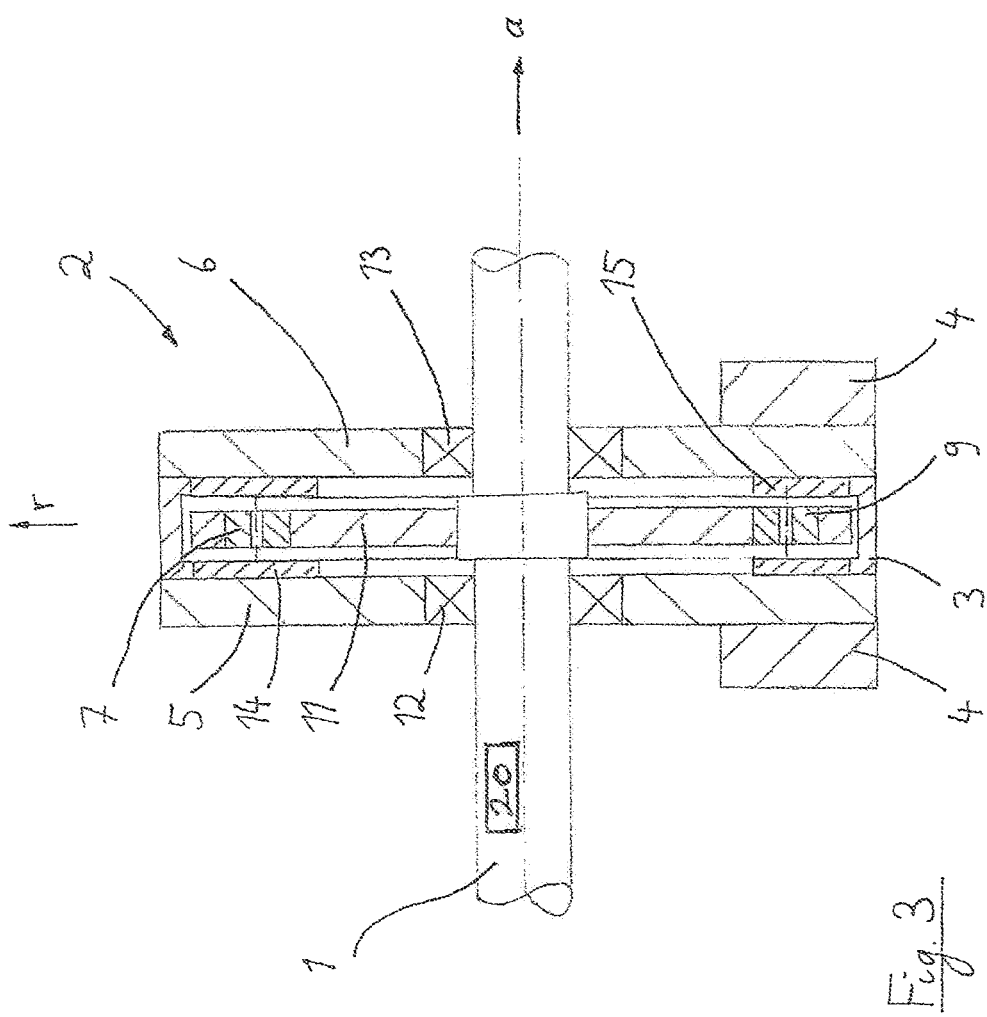
FIG. 3 shows the side view associated with FIG. 1 of a generator, which is represented here in one possible specific configuration.

In FIG. 1 and FIG. 2, first the principle of the construction of an energy source according to the invention in the form of a generator 2 is outlined purely schematically. The generator 2 serves as an energy source for an electrical consumer, which is not represented. It is provided that the rotation of a machine part 1 (see FIG. 3) of a metallurgical installation is used to generate electrical energy, with which the electrical consumer is supplied; this is for example a sensor, which senses defined operating parameters and transmits them for example by way of a transmitting unit 20 to a receiving unit, with which said operating parameters are monitored.

As is evident from the schematic representation shown in FIGS. 1 and 2, the generator consists of two metal plates 5 and 6, which are arranged parallel to one another, but spaced apart, in the direction of the axis a. Connected to each of the two metal plates 5, 6 is a multi-pole magnetic plate 14 and 15, respectively.

Arranged between the two magnetic plates 14, 15 are a number of coil rings 7, 8, 9, 10, which are in rotary connection with the rotating machine part (for details of this, see FIG. 3).

When the machine part rotates, and accordingly the coil rings 7, 8, 9, 10 also rotate with it, an electric voltage is induced as they pass by the magnetic plates 14, 15 and is used for supplying the electrical consumer.

A specific way in which the generator 2 is implemented in terms of mechanical engineering is outlined in FIG. 3. The rotating machine part 1 is schematically outlined here as a shaft and, during operation of the metallurgical installation, rotates about the axis a. This rotation is used in order to obtain electrical energy with the generator 2.

Connected to the machine part 1 for rotation therewith is a carrier element 11, which carries the coil rings 7, 8, 9, 10. The housing element 3 comprises the two lateral metal plates 5 and 6 and also the multi-pole magnetic plates 14 and 15, which are arranged with an air gap in relation to the carrier element 11 and in relation to the coil rings 7, 8, 9, 10. The metal plates 5 and 6, and consequently the entire housing element 3, are arranged rotatably on the machine part 1 by means of two bearings 12 and 13. Two eccentric masses 4, which are arranged on the housing element 3, can also be seen.

During the rotation of the machine part 1, the carrier element 11 with the coil rings 7, 8, 9, 10 consequently rotates with it; the housing element 3 is hindered from rotating with it in the way explained above by the eccentric masses 4, even though it is not supported with respect to the surroundings.

Consequently, the generator 2 may for example be arranged inside a rotating shaft of the metallurgical installation, in order to obtain electrical energy from the rotation of the shaft.

Preferably provided are consequently two multi-pole magnetic plates 14, 15, which form a closed magnetic circuit by means of the two metal plates 5, 6 (which act as iron yoke plates). Arranged in the air gap between the magnetic plates is the carrier element 11 with the coil rings 7, 8, 9, 10. The number of coils is coupled to the number of magnetic poles of the magnetic plates. The number of magnetic poles may in this way be varied; preferably, between 4 and 20 magnetic segments (magnetic poles) are on the magnetic plate.

The air gap between the surface of the coil rings and the magnetic plates is preferably in the range of 0.5 mm.

The geometrical sizes of the generator may otherwise be adapted to the circumstances, i.e. that is to say with a view to the question of how much installation space is available to receive the generator 2. An example of the installation space available in a shaft of a metallurgical installation is 150 mm in diameter and 200 mm in axial length. With this installation space it is possible without a problem to realize a generator that provides during rotation of the shaft power output of about 250 mW.

As a result of the axially relatively compact type of construction, it is also possible if appropriate for more than one generator to be arranged axially next to one another.

LIST OF DESIGNATIONS 1 rotating machine part
2 energy source (generator)
3 housing element
4 eccentric mass
5 metal plate
6 metal plate
7 coil ring
8 coil ring
9 coil ring
10 coil ring
11 carrier element
12 bearing
13 bearing
14 multi-pole magnetic plate
15 multi-pole magnetic plate
a axis
r radial direction

The invention claimed is:

1. A metallurgical device, comprising: at least one machine part rotatable about an axis; an energy consumer arranged on or in the machine part; and an energy source in electrical connection with the energy consumer, wherein the energy source is a generator in connection with the rotating machine part for rotation therewith, wherein the generator is otherwise free of any mechanical connection with the metallurgical device and wherein the generator is a housing element, on which at least one eccentric mass is arranged at a location that is at a distance radially from the axis, wherein the generator has two metal plates arranged parallel to one another and spaced apart axially from one another, wherein a number of coil rings arranged on a carrier element are arranged between the metal plates, wherein the metal plates are a component part of the housing element, wherein the housing element is mounted rotatably in relation to the rotatable machine part by bearings and wherein the carrier element is connected to the rotatable machine part for rotation therewith.

2. The device according to claim 1, wherein the machine part is a shaft or roller for conveying cast or rolled stock.

3. The device according to claim 1, wherein the energy consumer includes a sensor.

4. The device according to claim 1, wherein the energy consumer comprises a transmitting unit for transmitting a signal.

5. The device according to claim 1, wherein the generator comprises an electronic closed-loop control for closed-loop control of energy generated.

6. The device according to claim 1, wherein the generator is an axial-flow generator.

7. The device according to claim 1, wherein the generator is a radial-flow generator.

8. The device according to claim 1, wherein at least one of the metal plates is connected to a multi-pole magnetic plate arranged between the metal plate and the carrier element.

9. The device according to claim 8, wherein each of the metal plate is connected to a respective multi-pole magnetic plate arranged between the respective metal plate and the carrier element.

* * * * *